May 27, 1969  I. D. PRESS  3,446,248
REINFORCED HOSE
Filed June 20, 1967

INVENTOR.
IRVING D. PRESS
BY
Ward, Haselton, McElhannon, Brookes Fitzpatrick
ATTORNEYS United States Patent Office 3,446,248
Patented May 27, 1969

3,446,248
REINFORCED HOSE
Irving D. Press, West Orange, N.J., assignor to Resistoflex Corporation, Roseland, N.J., a corporation of New York
Filed June 20, 1967, Ser. No. 647,398
Int. Cl. F16l 11/00, 11/16, 11/12
U.S. Cl. 138—133                                   9 Claims

ABSTRACT OF THE DISCLOSURE

The reinforcement for a hose with a PTFE liner has a first spiral wrap of metal wire covered with an elastomeric layer followed by at least two additional metal reinforcing layers without an intervening elastomeric layer and with the innermost of the two additional layers being a spiral wrap.

---

The present invention relates to hose construction and, more particularly, to a reinforced hose having a lining layer of a substantially inelastic plastic material.

Where the principal component of a hose body is elastomeric in nature it has been a relatively simple matter to embed in the elastomeric matrix reinforcing filaments or layers of one form or another. Non-fabric type reinforcement has been utilized as often as woven or fabric forms. However, where the principal fluid containing element of the hose body is essentially inelastic as, for example, polytetrafluoroethylene resin (hereinafter abbreviated "PTFE"), unusual problems have been encountered.

From experience it has been found that a spiral wrap of metal wire around a PTFE liner provides higher pressure capability than a braided wire layer or sheath. But attempts in the past to apply several layers of metal wire reinforcement, particularly of the spiral wrap type, one upon the other directly over the PTFE liner to obtain increased burst strength have led to premature failure of the lines. Hence, it has become the accepted practice to dispose an elastomeric interlayer between each metal wire layer. Where several reinforcing layers are employed this has accounted for a substantial increase in the weight per unit length of the hose and in its size. It has also cut down on the minimum bend radius of the hose.

It has been discovered that the premature failures occurring in hose with multiple layer reinforcement has been due to high stress areas developing in the lining layer as a result of undesired displacement of the strands constituting a reinforcing layer during the construction of the hose. More important, it has been discovered that the critical region involves the first reinforcing layer. A braided layer by its very nature creates points of high stress concentration on the plastic liner when it is disposed directly over the liner. Hence, a spiral wrap is placed in contact with the liner. By retaining an elastomeric layer over the first spiral wrap layer it is possible to avoid displacement of the wires of the spiral wrap. The important discovery which forms the basis of the present invention is that disturbance of the strands in all reinforcing layers above the first is not liable to cause premature hose failure.

Therefore, in accordance with the present invention there is provided a reinforced hose comprising a lining layer of a substantially inelastic plastic material, a first reinforcing layer in the form of a spiral wrap of metal wire in direct contact with but unbonded to the outer surface of the lining layer, a layer of an elastomeric material disposed directly upon the first reinforcing layer, and at least two additional metal wire reinforcing layers above the elastomeric layer disposed one upon the other without an intervening elastomeric layer and with the innermost of the two additional layers being a spiral wrap.

The invention will be better understood after reading the following detailed description of certain preferred embodiments thereof with reference to the appended drawings wherein.

Reference should now be had to the drawings wherein the same reference numerals are used throughout to designate the same or similar parts.

Figure 1:
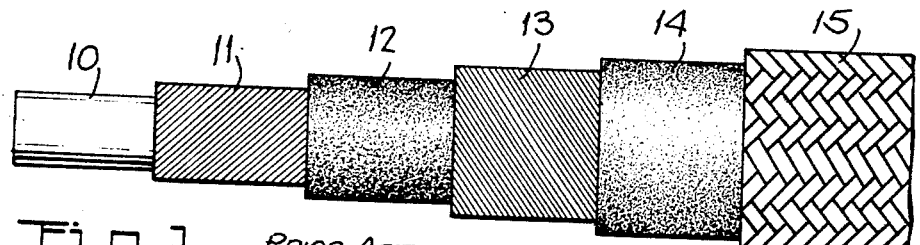
FIGURE 1 represents a diagrammatic illustration of a hose constructed in accordance with the prior art.

In FIGURE 1 there is shown a typical prior art high pressure hose construction having a lining 10 of a substantially inelastic plastic material such as PTFE. A first reinforcing layer 11 in the form of a spiral wrap of metal wire is wound in direct contact with but unbonded to the outer surface of the lining layer 10. In known manner, the reinforcing layer 11 is formed by wrapping a plurality of strands of metallic wire as a unit around the liner 10. As used herein, the expression "spiral wrap of metal wire" is intended to encompass a plural strand spiral wrap as well as a spiral wrap of a single strand.

Next, there is disposed upon the reinforcing layer 11 an elastomeric layer 12. The elastomeric layer 12 may take the form of a helical wrap of tape consisting essentially of a copolymer of hexafluoropropylene and vinylidene fluoride. Rather than a helical wrap, a longitudinal wrap may be substituted.

Over the elastomeric wrap 12 there is now disposed a spiral wrap of metal wire 13. As shown in FIGURE 1, the direction of winding of the wrap 13 is opposite to that employed in wrapping layer 11.

A layer 14 of elastomeric material is now disposed over the reinforcing layer 13. The layer 14 may be constructed in the same manner and of the same material as layer 12. Finally, the hose is sheathed with a layer or jacket 15 of braided metal wire.

Figure 2:
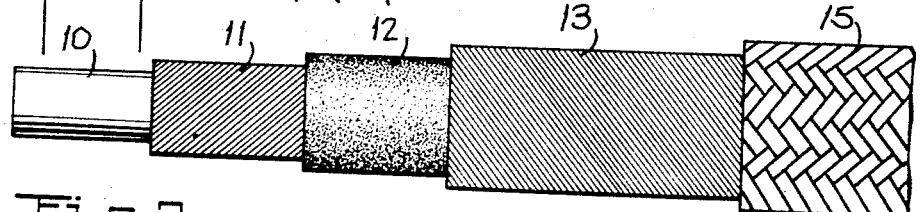
FIGURE 2 represents a diagrammatic illustration of a hose constructed in accordance with the present invention as an improvement over the hose of FIGURE 1.

The hose illustrated in FIGURE 2 represents the result of applying the concepts of the invention to the hose of FIGURE 1. That is, it yields a hose identical with the hose of FIGURE 1 with the significant difference that layer 14 has been eliminated. Thus, braided metal layer 15 is disposed directly upon spiral wrap metal layer 13 without an intervening elastomeric layer.

Figure 3:
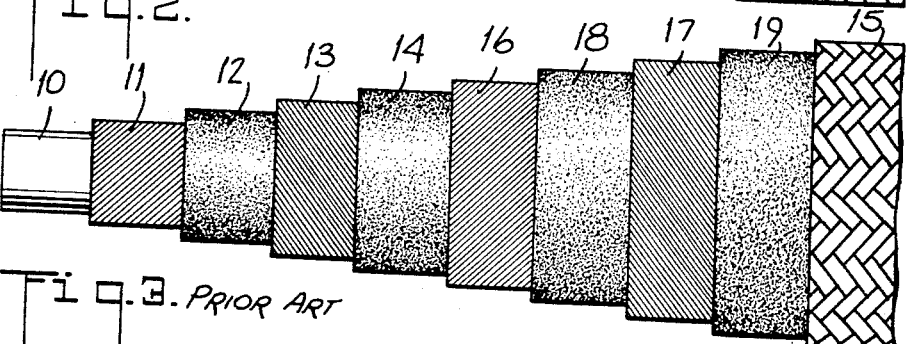
FIGURE 3 is a diagrammatic representation of another prior art hose construction.

In FIGURE 3 there is shown another prior art hose wherein additional reinforcing layers of spiral wrap metal wire alternate with additional elastomeric layers. Thus, there are two additional spiral wrap layers of metal wire 16 and 17 separated from each other by an elastomeric layer 18 and from the braided reinforcement 15 by another elastomeric layer 19. Layers 10, 11, 12, 13 and 14 are identical to the corresponding layers in FIGURE 1. The same is true of the jacket 15.

Figure 4:
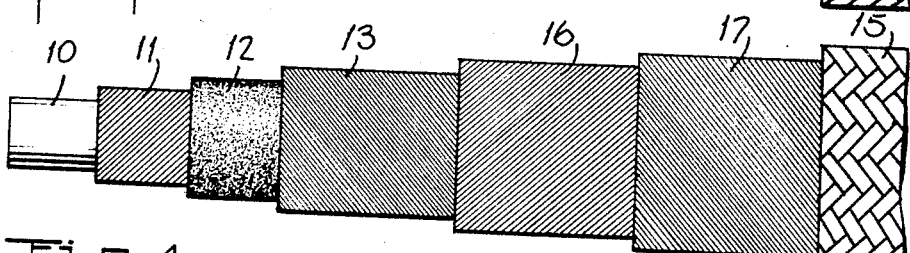
FIGURE 4 is a diagrammatic illustration showing the application of the invention to the hose of FIGURE 3.

Applying the teachings of the invention to the hose construction of FIGURE 3 yields the construction shown in FIGURE 4 wherein intervening elastomeric layers 14, 18, and 19 have been eliminated. As clearly seen in the drawings, the successive spiral wraps of metal wire alternate in direction of wrapping. In addition, following presently accepted technique, the total number of spiral wrap reinforcing layers are even in number so that half of the spiral wraps are wrapped in one direction and half in the opposite direction. This equalizes the stresses in the hose and prevents a twisting force from developing when the interior of the hose is pressurized in use. It will be apparent from a consideration of FIGURE 4 that, after the first reinforcing spiral wrap 11, the additional spiral wraps must constitute an odd number.

Figure 5:
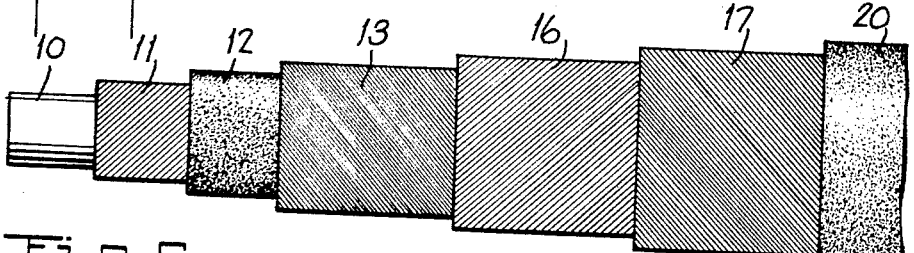
FIGURE 5 is a diagrammatic illustration of a modification of the hose of FIGURE 4.

In all of the embodiments described to this point the outer jacket has been formed by braiding metal wire. The advantages of the invention can be obtained in a modified hose construction as shown in FIGURE 5 wherein the outer protective jacket 20 may be elastomeric or resinous in nature while the underlying layers are the same as in the construction of FIGURE 4.

As used in the specification and claims, the expression "odd number" is intended to include the number "one" unless specified otherwise.

It will be understood that where the various metallic layers of reinforcing material are shown in direct contact with one another the individual strands of wire may be coated with a protective enamel or other non-elastomeric material. However, this is not necessary to obtain the advantages of the invention.

Having described the presently preferred embodiments of the invention, it will be understood that various changes may be made therein as will appear to those skilled in the art without departing from the true spirit of the invention as defined in the appended claims.

What is claimed is:
1. A reinforced hose comprising a lining layer of a substantially inelastic plastic material, a first reinforcing layer in the form of a spiral wrap of metal wire in direct contact with but unbonded to the outer surface of said lining layer, a layer of an elastomeric material disposed directly upon said first reinforcing layer, and at least two additional metal wire reinforcing layers above said elastomeric layer disposed one upon the other without an intervening elastomeric layer and with the innermost of said additional layers being a spiral wrap.

2. A reinforced hose according to claim 1, wherein an odd number other than one of additional spiral wraps of metal wire are disposed upon said elastomeric layer, the direction of wrapping of each of said spiral wraps including said first reinforcing layer being selected so that half of the spiral wraps are wrapped in one direction and half in the opposite direction, said additional spiral wraps being disposed one upon the other without intervening elastomeric layers.

3. A reinforced hose according to claim 2, wherein an outer protective sheath of braided metal wire is disposed upon the outermost of said additional spiral wraps without an intervening layer of elastomeric material.

4. A reinforced hose according to claim 2, wherein each of said spiral wraps is formed from a plurality of strands wrapped as a unit.

5. A reinforced hose according to claim 4, wherein said lining layer comprises extruded sintered polytetrafluoroethylene resin.

6. A reinforced hose according to claim 5, wherein an outer protective sheath of braided metal wire is disposed upon the outermost of said additional spiral wraps without an intervening layer of elastomeric material.

7. A reinforced hose according to claim 1, wherein said lining layer comprises extruded sintered polytetrafluoroethylene resin.

8. A reinforced hose according to claim 7, wherein the layer of elastomeric material consists essentially of a copolymer of hexafluoropropylene and vinylidene fluoride.

9. A reinforced hose according to claim 1, wherein the outermost of said two additional layers is of braided construction.

References Cited
UNITED STATES PATENTS

| | | | |
|---|---|---|---|
| 1,973,756 | 9/1934 | Gish | 138—133 |
| 3,266,527 | 8/1966 | Ross | 138—129 |

HENRY S. JAUDON, *Primary Examiner.*